United States Patent [19]
Novak et al.

[11] 3,741,598
[45] June 26, 1973

[54] PNEUMATIC BUMPER

[76] Inventors: Andrew Novak, 3030 West Ridgeway; Lawrence L. Novak, 2201 Welch Boulevard, both of Flint, Mich. 48504; Mick Novak, 12248 West Mount Morris Road, Flushing, Mich. 48458

[22] Filed: June 21, 1971

[21] Appl. No.: 154,974

[52] U.S. Cl. .............. 293/71 P, 267/116, 267/122, 267/140
[51] Int. Cl. .......................... B60r 19/10, F16f 9/10
[58] Field of Search .......... 293/71 R, 71 P, DIG. 1, 293/DIG. 2; 267/116, 120, 122, 140, 141, 153

[56] References Cited
UNITED STATES PATENTS
3,187,710  6/1965  Wilfert ............................. 116/28
278,007   5/1883  Garsed .............................. 24/125
2,959,146  11/1960  Erkert ............................. 114/219

*Primary Examiner*—James B. Marbert
*Assistant Examiner*—Robert Saifer
*Attorney*—Robert C. Hauke, Harry R. Dumont et al.

[57] ABSTRACT

An inflatable bumper for a vehicle which includes an elongated frame having an upper and a lower projecting lip and an inflatable tube of substantially "H" cross-sectional configuration including forward and rearward air chambers. The opposing lips of the frame extend between the chambers to hold the tube in place. An alternate embodiment includes a plurality of accordion-like lateral folds across the upper and lower surface of the front chamber to facilitate its resilient compression under collision conditions.

4 Claims, 4 Drawing Figures

PATENTED JUN 26 1973
3,741,598
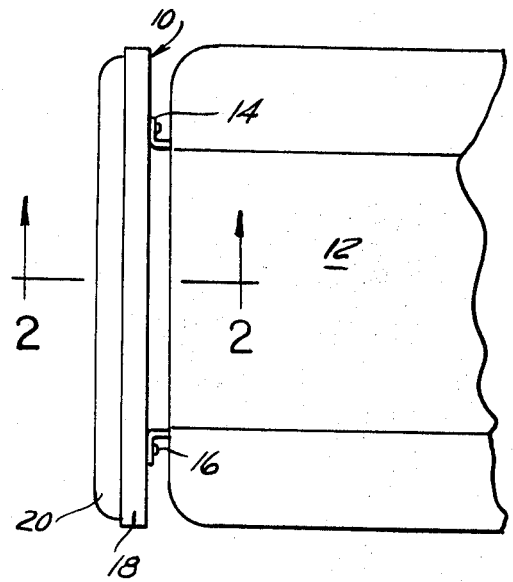
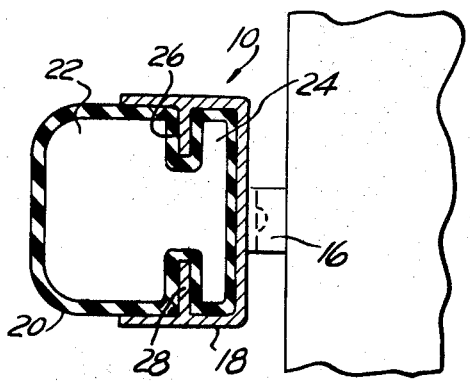
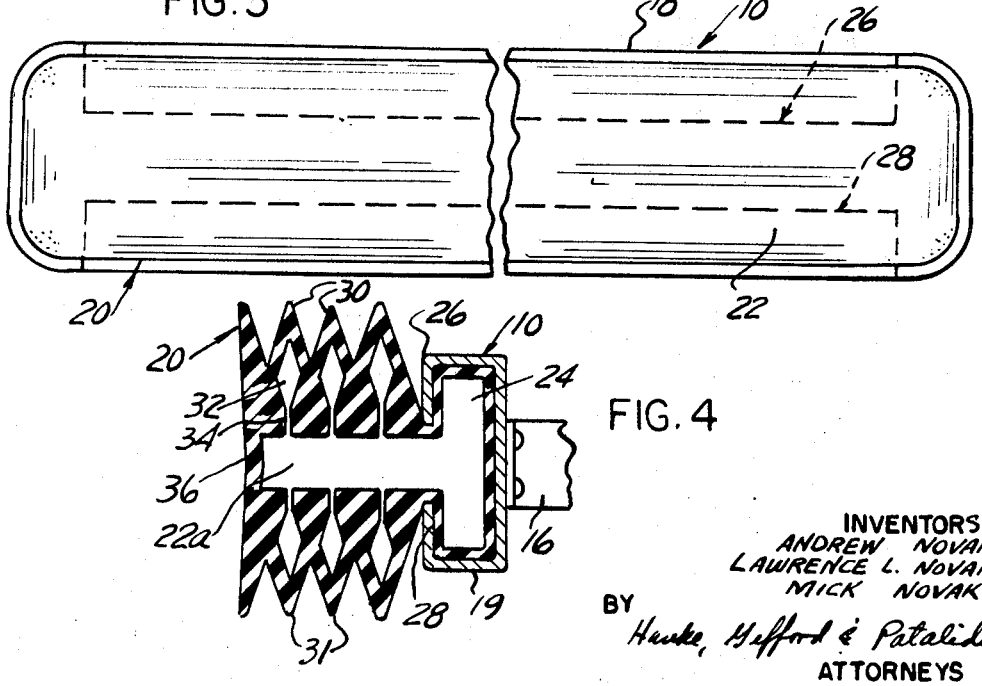
INVENTORS
ANDREW NOVAK
LAWRENCE L. NOVAK
MICK NOVAK
BY *Hauke, Gifford & Patalidis*
ATTORNEYS

PNEUMATIC BUMPER

BACKGROUND OF THE INVENTION

The field to which this invention relates is that of safety bumpers for vehicles such as automobiles. More specifically, it relates to bumpers which incorporate inflatable elements which themselves tend to absorb the shock of a collision and prevent it from being transmitted to the vehicle. The bumper according to this invention may be mounted on either the forward or the rearward end of the vehicle, or, preferably, on both. Various prior art bumpers of the pneumatic type are known, but these generally may be characterized as incorporating a single tube or air chamber of the tire type which is mounted transversely on the bumper frame and retained in place through a bead or like structural element. The shock and impact absorbing characteristics of such devices are limited. The bumper constructed in accordance with the teachings of the present invention makes it possible for a vehicle to withstand impact at speeds ranging up to 15 m.p.h. without incurring any substantial damage to the vehicle. Where there is destruction of parts, it is normally confined to the elements of the bumper. It will be seen that the replacement of such elements is relatively inexpensive, particularly with regard to the inflatable elements which normally extend somewhat forwardly of the metal frame and absorb most of the impact and shock.

SUMMARY OF THE INVENTION

The present invention involves a double chamber pneumatic bumper in which the shock impact is lessened by both the forward and the rearward chambers. The forward chamber itself may be formed with a configuration adapted to admit pressurized air from the forward chamber to auxiliary sacs or chambers, and to thereby relieve stresses occuring at the periphery of the forward chamber.

BRIEF DESCRIPTION OF THE DRAWINGS

The following specification will make particular reference to the appended drawings in which like numerals are used to designate identical parts throughout the several views, and wherein:

FIG. 1 is a top plan view showing the bumper as it is attached to the front of a motor vehicle, which is disclosed only in part;

FIG. 2 is a cross-sectional view of the bumper of FIG. 1 taken along the section lines 2—2;

FIG. 3 is a front elevational view of the bumper of FIGS. 1 and 2; and

FIG. 4 is a cross-sectional view of an alternate embodiment of this invention.

DESCRIPTION OF THE PREFERRED EMBODIMENT

In FIG. 1, a bumper 10 is shown as it is mounted at the forward end of a motor vehicle 12. The bumper 10 is mounted securely in place on the vehicle by a pair of spaced brackets 14 and 16. The bumper 10 further includes as its major elements a metallic frame 18 and a forwardly extending pneumatic tube 20. Air is introduced under pressure to the tube 20 through a suitable valve means.

FIG. 2 shows the detail of the construction of the bumper 10 and particularly of the pneumatic tube 20 and of the frame 18 which retains the tube in place.

The tube 20 is preferably formed of a cord and rubber material and includes a forward chamber 22 and a rearward chamber 24. It will be noted that the forward chamber 22, which receives the initial shock of collision, is somewhat larger in cross-sectional size than the rearward chamber 24.

The frame 18 has a closed rearward portion and includes an upper lip 26 which extends downwardly toward an opposed lower lip 28. It will be seen that the lips 26 and 28 operate to retain in place the pneumatic tube 20. This makes it possible to readily assemble the bumper 10 parts. In the event the replacement of a ruptured tube 20 becomes necessary, the tube 10 is threaded in a non-inflated condition crosswise into the bumper frame 18 between the lips 26 and 28 and then inflated. It will further be seen that the lips 26, 28 are preferably fabricated from a deflectable material, such as spring steel, to permit their bending along with the movement of the tube 20. After the initial shock, the lips 26, 28 are restored to their original vertically oriented positions. In this way, the shock of a collision is normally compensated for without causing any permanent deformation or damage to the frame 18 itself. It will further be seen that there is provided a resistance to the rearward movement of the lips 26 and 28 through the second and rearward chamber 24 in such manner as to further dampen and absorb the shock received at the front of the bumper 10.

FIG. 3 shows the bumper 10 as it is viewed from the front, with the edge of the frame 18 protruding both above and below the tube 20. The forward chamber 22 of the tube 20 extends frontwardly in advance of the frame 18 when the bumper is assembled and placed into its inflated position. It will further be seen that the tube 20 extends throughout a length which is substantially the same as the overall length of the frame 18.

An alternate embodiment of the present invention is illustrated in the drawing of FIG. 4. The embodiment of FIG. 4 differs from the embodiment shown in FIGS. 1–3, particularly with respect to the mode of construction and design of the forward chamber of the tube 20. The frame 19 likewise differs from the frame 18 shown in connection with the first embodiment. With respect to the forward chamber 20, it includes a central chamber 22a which is somewhat smaller in size than the forward chamber 22 as was illustrated in FIG. 2. There are included in the periphery of the forward chamber 20 a plurality of laterally extending convolutions or accordion-like folds. The upper folds are identified by the numeral 30. Included in each of the folds 30 is a transverse central air sac 32, each of which communicates with the forward chamber 22a through its respective passage 34. It will be seen that, responsive to collision shock at the forward end of the chamber 20, air will be spilled and ejected through the several passages 34 upwardly or downwardly as the case may be into the several central sacs 32 so as to provide stress relief with respect to the pneumatic tube 20. The forward end of the forward chamber 22a also will be seen to include a somewhat recessed portion 36 to facilitate folding under compression near its central and forwardly projecting portions.

As already indicated, the frame 19 additionally has been somewhat modified as compared to the first embodiment. Included in the frame 19 are the upper lip 26 and the lower lip 28 which have the like function of retaining in place the pneumatic tube 20. In the FIG. 4 embodiment, it will be seen that the height of the forward chamber 20, as measured from each upper fold 30 to its corresponding lower fold 31, is somewhat greater than the height of the frame 19. This permits the collapsible chamber 20 to be readily deflected and folded around or over the upper and lower edges of the frame 19 without breaking any portions of that frame. The deflectable lips 26 and 28 also perform the function of resiliently damping the shock received by the bumper.

The present invention affords a greatly improved bumper for vehicles, both with respect to the improvement of the collision absorbing characteristics of the bumper and with respect to the low cost of fabrication of the main components required in the system. The repair and replacement of any of the parts which may be damaged on impact is readily accomplished.

We claim:

1. A pneumatic bumper for a vehicle comprising an elongated frame transversely mountable at either end of said vehicle, said frame comprising an upper and a lower lip, one extending toward the other and mounted at the forward and open end of said frame; a pneumatic chamber comprising a rearward portion, said rearward portion mounted between said lips and the ear of said frame, and a forward portion, said forward portion including a plurality of transverse folds having their horizontal axes substantially parallel to that of said frame, said folds further each including a transversely extending air sac in communication with said forward chamber portion for receiving air displaced from said forward portion of said chamber responsive to impact of an object thereagainst, and a central recessed portion included in the front surface of said forward chamber portion, said recessed portion substantially coextensive with the length of said forward chamber portion.

2. A pneumatic bumper for a vehicle comprising a closed frame attachable to one end of the vehicle, said frame including an upper and lower transverse lip extending one towards the other; a pneumatic tube extending substantially coextensive in length with said frame, said tube including a forward and a rearward chamber separated one from the other and retained in said frame by said lips, said forward chamber including a plurality of accordion-type folds extending transversely across the top and bottom outer surfaces of said forward chamber, said forward chamber having an overall width substantially larger than the width of said frame.

3. The combination as set forth in claim 2 wherein each of said transverse folds includes a central sac of relatively small dimension that extends across said fold in the lengthwise direction of said frame to provide flow of pressurized air into said sac from said forward chamber responsive to impact against said forward chamber.

4. The combination as set forth in claim 3 wherein there is included across the front surface of said forward chamber a concave central portion substantially coextensive in length with said forward chamber.

* * * * *